United States Patent

Moshe

(10) Patent No.: US 9,735,899 B2
(45) Date of Patent: Aug. 15, 2017

(54) DEVICE AND METHOD FOR CALIBRATING ANTENNA ARRAY SYSTEMS

(71) Applicant: VAYYAR IMAGING LTD, Yehud (IL)

(72) Inventor: Shay Moshe, Petach Tikva (IL)

(73) Assignee: VAYYAR IMAGING LTD., Yehud (IL)

(*) Notice: Subject to any disclaimer, the term of this patent is extended or adjusted under 35 U.S.C. 154(b) by 103 days.

(21) Appl. No.: 14/499,505

(22) Filed: Sep. 29, 2014

(65) Prior Publication Data

US 2015/0138026 A1 May 21, 2015

Related U.S. Application Data

(60) Provisional application No. 61/884,889, filed on Sep. 30, 2013.

(51) Int. Cl.
| | |
|---|---|
| G01R 29/10 | (2006.01) |
| H04B 17/12 | (2015.01) |
| H04B 17/21 | (2015.01) |

(52) U.S. Cl.
CPC ............. H04B 17/12 (2015.01); H04B 17/21 (2015.01)

(58) Field of Classification Search
CPC ................................. G01R 29/10; H04B 17/12
USPC ........................................................ 343/703
See application file for complete search history.

(56) References Cited

U.S. PATENT DOCUMENTS

| | | | |
|---|---|---|---|
| 2011/0134001 A1* | 6/2011 | Sakata ................. | G01R 29/105 343/703 |
| 2013/0141287 A1* | 6/2013 | Pallonen ................ | G01R 29/10 343/703 |
| 2013/0271328 A1* | 10/2013 | Nickel ................... | G01R 29/10 343/703 |
| 2014/0179239 A1* | 6/2014 | Nickel .................. | H04W 24/00 455/67.14 |

\* cited by examiner

*Primary Examiner* — Dameon E Levi
*Assistant Examiner* — Hasan Islam
(74) *Attorney, Agent, or Firm* — Browdy and Neimark, PLLC

(57) ABSTRACT

A method and a system for calibrating an antenna array. The method may include the following steps: attaching successively pairs of a plurality of probe antennas to each other; performing an initial measurement of a multiport formed by the ports of said pair of probe antennas, the initial measurement yielding initial coefficients of said probe antennas; attaching successively one of said probe antennas to one of the antennas in said antenna array; performing a second measurement of multiports formed by the ports of said probe antennas and said antenna array, the second measurement yielding coefficients of the combination of said antenna array and said probe antennas; and using the initial coefficients and the second measurement coefficients to calibrate said antenna array.

5 Claims, 7 Drawing Sheets

DEVICE AND METHOD FOR CALIBRATING ANTENNA ARRAY SYSTEMS

FIELD OF THE INVENTION

The present invention relates to antenna array systems. In particularly the present invention relates to the calibration of antenna arrays in such systems including vector network analyzers.

BACKGROUND OF THE INVENTION

At radio frequencies, from low frequencies into the GHz range, vector network analyzers (VNA) are used for the accurate measurement of active and passive circuits. Among other uses, VNAs are used in antenna ranges in order to characterize antenna devices.

A VNA typically measures the so-called scattering parameters of n-port devices (n=1, 2, . . .), which are optionally converted into other sets of multiport parameters (for example, Z-parameters or Y-parameters). However, at high frequencies this measured data may have substantial measurement errors. Error correction procedure for the VNA were developed, which ensure that accurate measurements of high-frequency electronic components are realizable. The measurement accuracy of VNAs depends primarily upon the availability of a method for system-error correction. The correction process is also called in the art "calibration" or "deembedding."

In the case of error correction, within the so-called calibration process, devices under test (DUT), which are known in part or in their entirety, are measured with regard to reflection and/or transmission behavior. Correction data (so-called error-values or coefficients) are obtained from these measured values, via special computational methods. With these correction data and a corresponding correction calculation, corrected measured values are obtained for every required device under test.

The conventional form of description for the electrical behavior of components and circuits in high-frequency technology is provided via the scattering parameters (also referred to as S-parameters). The scattering parameters relate wave quantities rather than currents and voltages. This presentation is particularly well adapted to the physical circumstances of high-frequency technology. If required, these scattering parameters can be converted into other electrical network parameters, which link currents and voltages.

Antennas are usually characterized in terms of antenna gain (transmission) and of reflection from the antenna feed port only. This characterization disregards the reflection of the incoming radiation from the antenna. These reflections are substantial in measurement systems operating in the near field of the antenna and therefore there is an interest in characterizing the antennas as a full 2-port device.

As shown in FIG. 1, an RF antennas' array system 100, as known in the art comprises three parts: a Radio Frequency (RF) Signals measurement unit such as a VNA 110 configured to generate and transmit a number of RF signals and measure the received/reflected signals; an array unit 120 comprising one or more antennas 125 which transfer the RF signals to propagating a wave in the transmit-path and back in the receive-path; and routing electronic RF components such as cables, connectors, splitters, attenuators and switches which are used to connect the network analyzer ports 115 to the antenna array unit 120. The exemplary antenna array system 100 can be a MIMO radar system which characterizes the properties of a DUT 140 in order to assess its shape or composition from the electromagnetic wave reflections.

In network-analyzer based systems, it is common to model the system using 'signal flow graph' which describes the system's transmitted and reflected signals at the input and output of each component in the system and the component may be modeled using set of transmission and reflection coefficients. Measurement errors are typically caused by the system's routing electronic elements (such as the switches, ports, couplers etc.). In order to compensate the measurement errors a calibration process is required.

The prior art solutions that are currently used, include specifically a calibration flow for RF array measures which corrects only the routing electronic of the array without the antennas.

SUMMARY OF THE INVENTION

It is an object of the present invention to provide a system and method that allows a full 2-port characterization of an antenna array system with regard to transmitted and reflected waves (i.e. S-parameters).

It is another object of the present invention to provide a method and system that will allow calibrating the array system including an antenna array, the Radio Frequency (RF) Signals measurement unit or the VNA without disconnecting or disabling the VNA and/or the antennas during the calibration process.

It is yet another object of the present invention to provide a method and system that will allow obtaining and correcting the return-loss and transmission-loss coefficients of the antenna array system (i.e. including the VNA and the antennas). Other objects of the invention will become apparent as the description of the invention proceeds.

Thus, according to an aspect of some embodiments of the present invention there is provided a method for calibrating an antenna array comprising a plurality of antennas, the method comprising: attaching successively pairs of a plurality of probe antennas to each other; performing an initial measurement of a multiport formed by the ports of said pair of probe antennas, the initial measurement yielding initial coefficients of said probe antennas; attaching successively one of said probe antennas to one of the antennas in said antenna array; performing a second measurement of multiports formed by the ports of said probe antennas and said antenna array, the second measurement yielding coefficients of the combination of said antenna array and said probe antennas; and using the initial coefficients and the second measurement coefficients to calibrate said antenna array.

The method may involve measuring Scattering parameters of plurality of pairs of said probe antennas; and calculating S parameters of all antennas in said probe antennas wherein said calculating is according to the measured Scattering parameters of plurality of pairs of said probe antennas.

The method may entail measuring Scattering parameters of plurality of pairs of said probe antennas and array antenna; and calculating S parameters of all antennas in said antenna array wherein said calculating is according to the measured S parameters of plurality of pairs of said probe antennas.

In an embodiment said pairs of said plurality of probe antennas are represented as a function of the Scattering-parameter of each antenna.

According to a second aspect of the present invention, there is provided a system comprising: an antenna array, said antenna array comprising a plurality of antennas; a plurality of external antenna unit said external unit comprising a plurality of probe antennas, said probe antennas are configured to be attached to said antenna array; a Radio Frequency Signals Measurement Unit (RFSMU) configured to be attached to said antenna array unit, said RFSMU comparing a processor, wherein said processor is further configured to: perform an initial measurement of a multiport formed by the ports of pair of probe antennas attached successively to each other, the initial measurement yielding initial coefficients of said probe antennas.

According to a third aspect of the present invention, there is provided a Radio Frequency Signals Measurement (RFSM) devise for calibrating an antenna array, said device comprising a processor wherein said processor is configured to: perform an initial measurement of a multiport formed by the ports of pair of external probe antennas attached successively to each other, the initial measurement yielding initial coefficients of said probe antennas; a second measurement of multiports formed by the ports of said external probe antennas and said antenna array, the second measurement yielding coefficients of the combination of said antenna array and said probe antennas; and to utilize the initial coefficients and the second measurement coefficients to calibrate said antenna array.

According to a fourth aspect of the present invention, there is provided a method for use in calibrating a plurality of antennas comprised in an antenna array unit wherein said antenna array unit is connected to a Radio Frequency (RF) Signals Measurement Unit, said method comprises: providing a plurality of external antennas; measuring S-parameters of plurality of pairs of said external antennas; connecting successively one of said external antennas to one of the antennas in said antenna array unit; measuring S-parameters of the combination of said antenna and said external antenna; and calibrating said antenna array unit.

The method may involve measuring S-parameters of said Radio Frequency (RF) Signals Measurement Unit ports connected to said antenna array unit.

The term "Vector Network Analyzer (VNA)" as used herein and through the specification and claims should be understood to encompass an electrical device used to generate and transmit RF signals and to measure the ratios between the received RF signals and the transmitted one. Those relations represent the reflection and transmission coefficients of the tested port.

The term "S-parameters" (Scattering parameters) as used herein and through the specification and claims should be understood to encompass scattering parameters, e.g. the set of reflection and transmission coefficients of a system from each port to the other. Two ports "S-parameters" typically include 4 terms:
 Port1 and port2 reflection coefficients (2 Terms)
 Port1 to port2 and port2 to port1 transmission coefficients (2 Terms)

The term "T Parameters" (Transfer parameters) as used herein and through the specification and claims should be understood to encompass transfer parameters, which are another transformation of the S-parameters, in which concatenation of 2-port devices is translated into matrix multiplication of the corresponding T-parameter matrices of the corresponding 2-port devices.

The term "Antenna" as used herein and through the specification and claims should be understood to encompass an RF element used to transfer electrical RF signal (voltage and current) to propagating wave (electrical & magnetic fields).

The term "Antenna's physical port" as used herein and through the specification and claims should be understood to encompass the antenna's side which is connected for example to the NA's port via the routing electronic.

The term "Antenna's spatial port" as used herein and through the specification and claims should be understood to encompass an abstract entity defined as the imaginary aperture of the antenna from which the wave is transmitted to the open space/medium. This definition is used in the invention in order to define reflection and transmission coefficients for the antenna as seen from the array (the other antennas).

The term "Cross-talk between ports" as used herein and through the specification and claims should be understood to encompass the leakage signal from one port to the other. When the isolation between ports is good, the cross-talk is neglected.

The term "DUT—Device Under Test" as used herein and through the specification and claims should be understood to encompass reference to the target medium in-front of the array of which we would like to characterize.

The term "De-embed" as used herein and through the specification and claims should be understood to encompass the process of correcting S-parameters' error terms from the measured signals.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF THE INVENTION

A better understanding of the present invention is obtained when the following non-limiting detailed description is considered in conjunction with following figures.

As previously explained, a calibration process is necessary to compensate the measurement errors caused by the antenna array system's routing electronic elements, including for example the VNA and the antennas.

The methods commonly used today for measuring antennas do not include full 2-port S-parameter measurement, but rather to reflection and gain measurements only. Moreover, by having 2-port characterization capability, the effect of the interconnecting elements such as transmission lines and switches on the radiation reflection from the antenna can be characterized.

The present embodiments relate to a system device and method for calibrating an RF antennas array system using external probe antennas to obtain and correct the return-loss and transmission-loss coefficients of the RF antennas array with the probe antennas, including the ports representing the antenna radiation to the space. This enables, for example to compensate the return loss of production related variance between the antennas' array connectors as well as other electronic mismatches. Additionally, the use of external probe antennas for calibrating the array system allows a simple and inexpensive manufacture of the array system components and units all on the same printed circuit board, without the need to disassemble the system units such as the antenna during a calibrating process.

Figure 1:
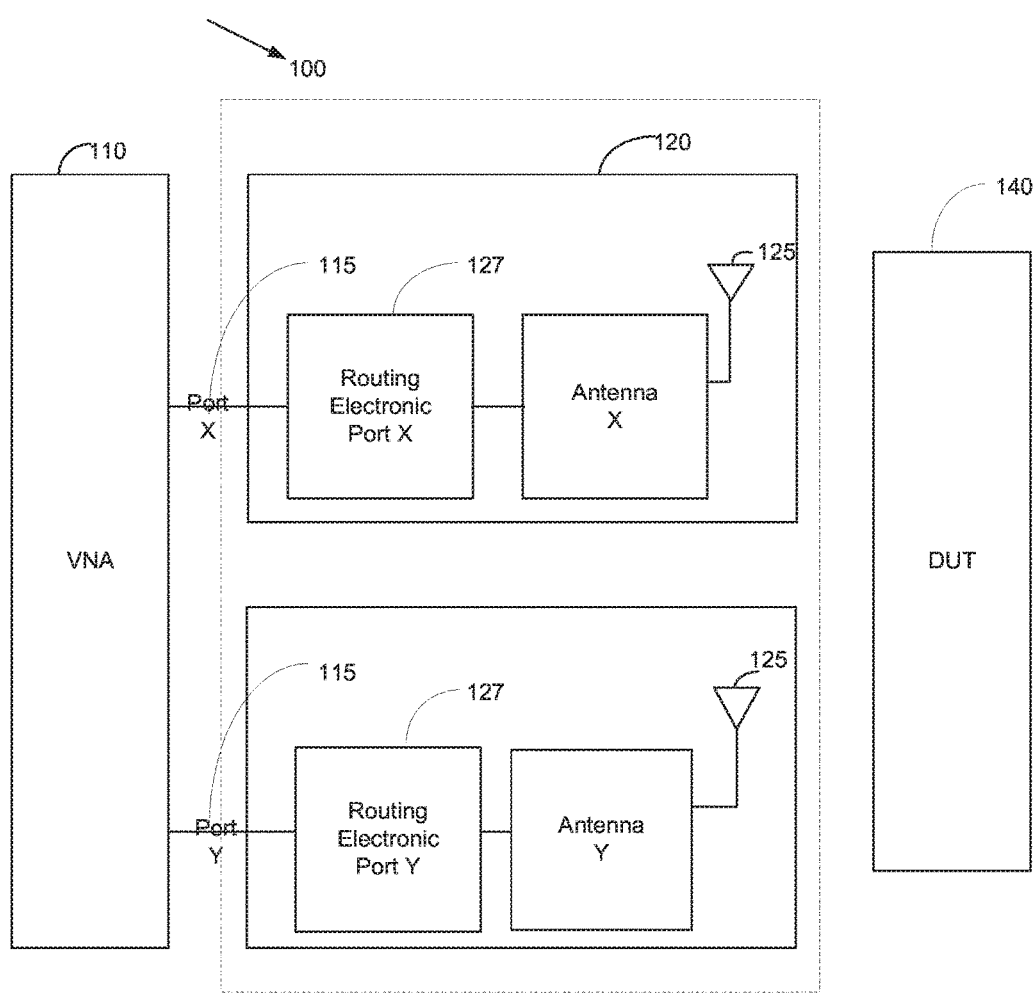
FIG. 1—shows a simplified block diagram of an RF array system according to some embodiments of the prior art.
Figure 2:
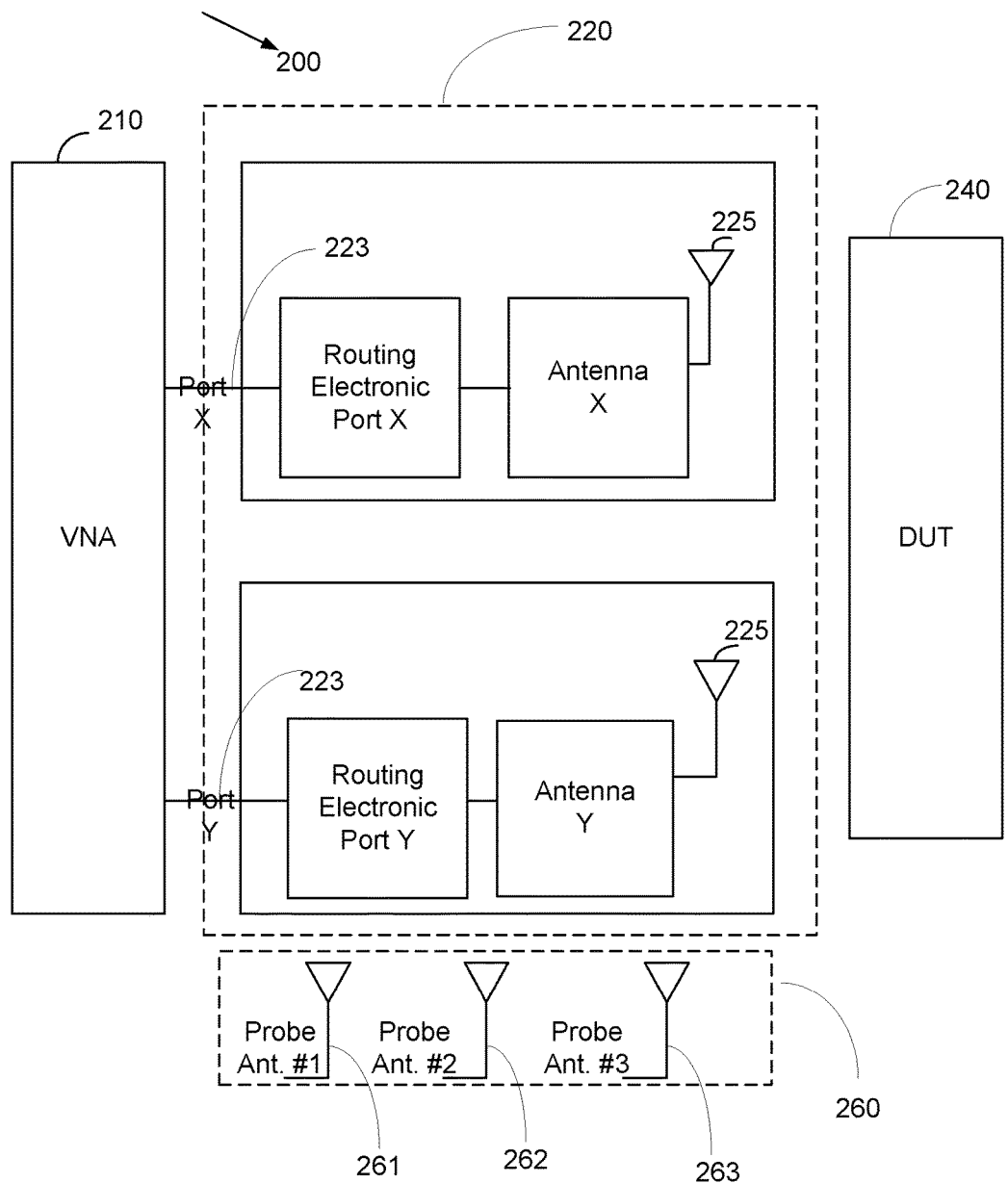
FIG. 2—shows a simplified block diagram of an array system, constructed according to embodiments of the present invention.

FIG. 2 is an example demonstrating an embodiment of the invention for calibrating system 200, including a plurality of antennas 225, to correct the implications caused by the system's electronic portions e.g. measuring a set of reflection and transmission coefficients of a system from each port to the other, including the antenna's ports (e.g. S22 parameters of the antenna's ports connected to the VNA).

According to one embodiment of the invention, the system 200 illustrated in FIG. 2 comprises a VNA 210, an antenna array unit 220 comprising a number of ports (1,2 . . . n) 223 and antennas under test (1,2 . . . n) 225 respectively connected to the VNA ports(1,2 . . . n). The array unit 220 is configured to measure and characterize a DUT 240 located for example in front of the antenna array unit 220. The DUT 240 may be for example a drywall of the composition which is being characterized. An external antenna unit 260, including for example 3 probe antennas 261, 262, 263 is configured to be connected to the antenna array unit 220 as described in further detail herein below.

According to one embodiment of the invention, in order to calibrate the system 200, an error term per each of the system's ports such as ports 223 is estimated so it could later-on be de-embedded and obtain the signals in the DUT 240 inputs. For each of the system's ports, a full S-parameters 2×2 matrix is provided to describe the error terms of the system's electronic elements (e.g. including the ports, and proceeding with the probe's corresponding routing and antenna units). As will be appreciated by those skilled in the art, as it is assumed that the cross-talk between the system's ports is negligible, the provided matrix per port does not depend on the counter port for each Tx/Rx.

According to one embodiment of the invention, the S-parameters matrix measurement may be provided using the external antenna unit 260 and the plurality of probe antennas (e.g. antennas 261, 262 and 263). The probe antennas 261, 262 and 263 are configured to be attached to each of the 'tested antenna' 225 at the antenna array 200 so the coupling between the antennas (i.e. the probe antenna 261, 262 and 263 and the tested antenna 225) is maximal.

In order to remove the impact of the probe antenna (e.g. 261,262 or 263) on the S matrix measurement, the probe antenna itself needs to be characterized. A well-known method to measure the gain of a reference antenna is a "three antenna method". However, this method is insufficient in order to characterize the full 2-port parameter matrix of the reference antenna. According to some embodiments of the present invention there is provided a method for extracting a full 2-port parameter matrix of a probe antenna so that full 2-port characterization of an antenna under test (i.e. Antenna 225) can be obtained.

Figure 3:
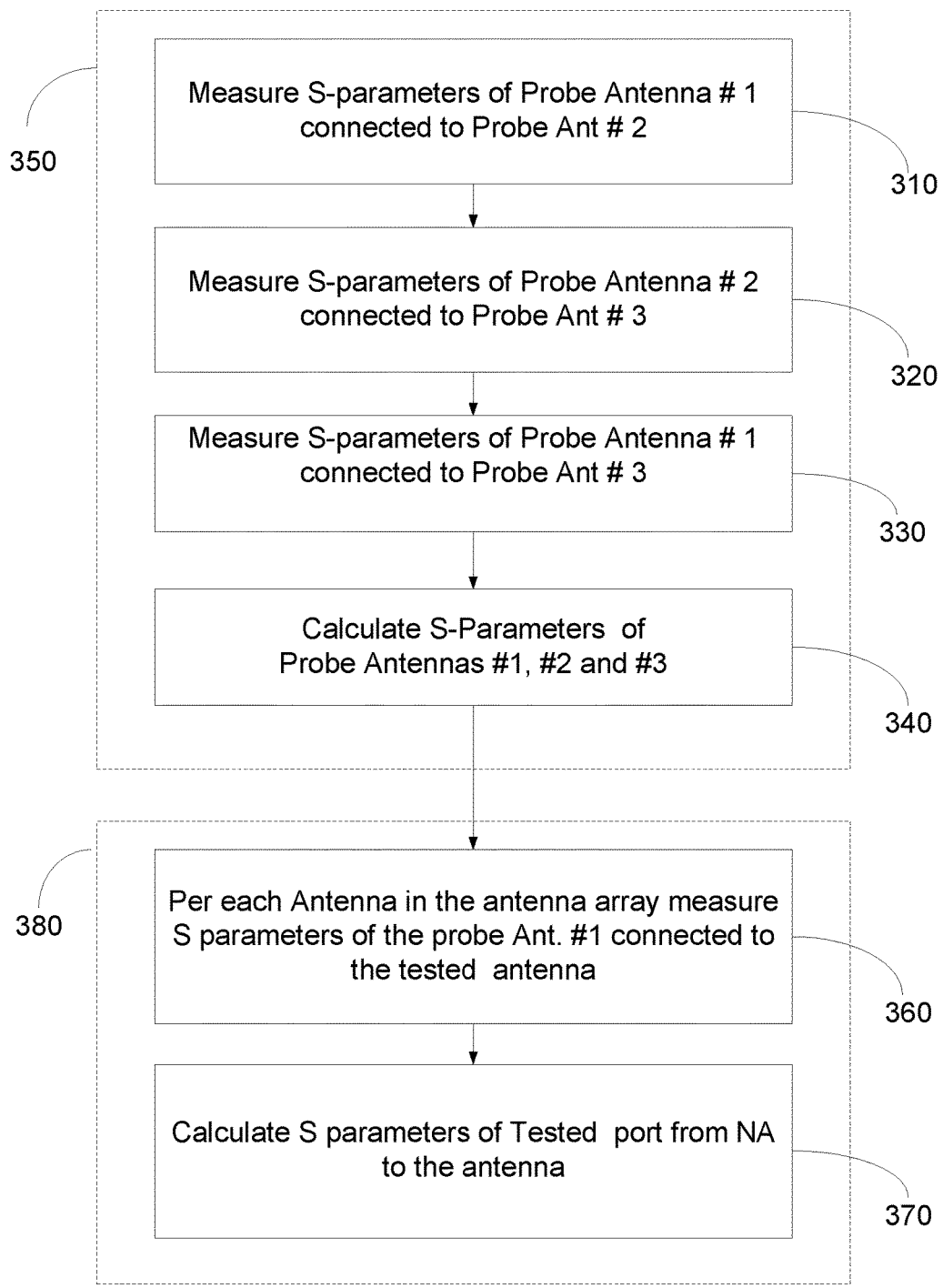
FIG. 3—is a simplified flow chart illustrating a procedure for calibrating the array system according to embodiments of the present invention.

Reference is now made to FIG. 3, which is a simplified flow chart illustrating the steps of the antenna system calibration process. In general, the calibration process includes two main phases, in the first phase (350) the probe antennas (antenna 261, 262 and 263) parameters are measured and in the second phase (380) the array's antennas 225 parameters are measured.

Figure 4:
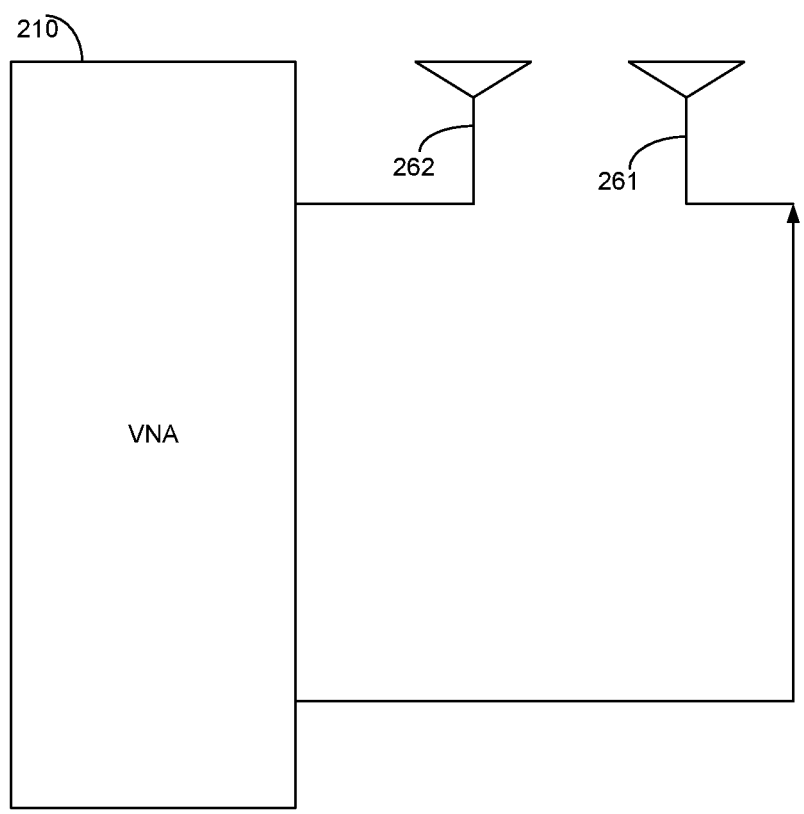
FIGS. 4 and 5—show a simplified block diagram of the first phase of the antenna array calibration process according to embodiments of the present invention.
Figure 5:
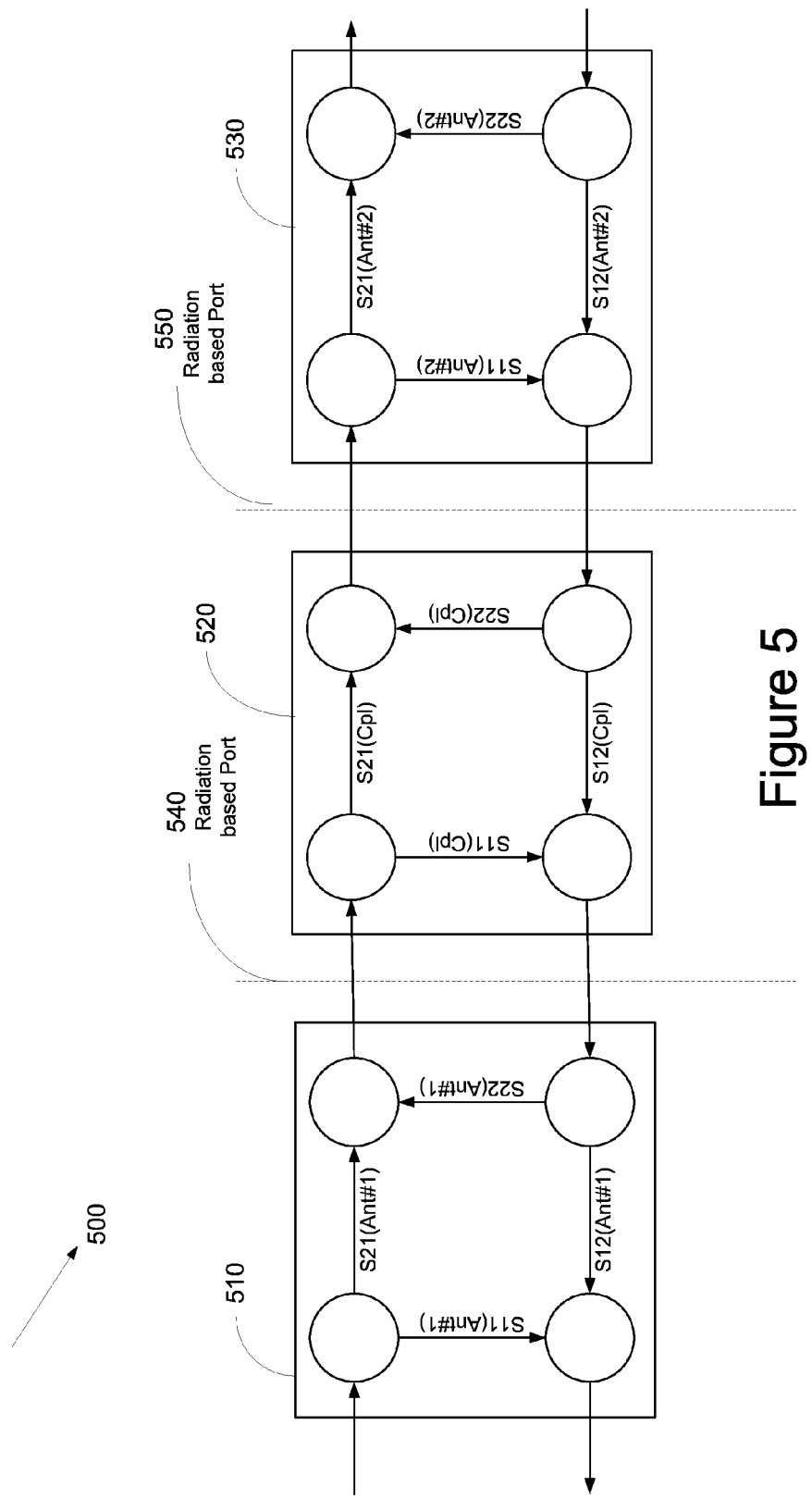

In step 310, the S-parameters of Probe antenna #1 (antenna 261) connected to Probe antenna #2 (antenna 262) are measured. The physical set-up of this measurement is illustrated in FIG. 4 and the T-parameter equivalent representation is illustrated in FIG. 5. In the sequel, same measurement is performed with the pair Probe antenna #2 (antenna 262) and Probe antenna #3 (antenna 263), and with the pair Probe antenna #3 (antenna 263) and Probe antenna #1 (antenna 261).

According to the present invention, the S-parameters of two attached antennas may be represented as a function of the S-parameters of each antenna. For example, each antenna may be described using its reflection and transmission coefficients at its physical port combined with the reflection and transmission coefficients at its 'spatial port'. As illustrated in FIG. 4 the reflection coefficient at the 'spatial' port of Probe antenna #1 (antenna 261) represents the returned signal from Probe antenna #1 as measured in Probe antenna #2 (antenna 262). FIG. 5 further illustrates the Transfer parameters model 500 of an antenna to antenna setup, such as Probe antenna #1 (antenna 261) and Probe antenna #2 (antenna 262). The Transfer parameters model 500 is represented by three blocks, 510, 520, 530: physical representation of Antenna #1 (510), coupling between Antenna #1 and Antenna #2 (520) and physical representation of antenna #2, where dotted lines 540 and 550 illustrate the radiation based port between the antennas (e.g. multiports formed by the ports of the antennas).

The setup may be represented as follows:

$$T(\text{ant1, ant2}) = T_l(\text{ant\#1}) \cdot T(\text{Cpl}) \cdot T_r(\text{ant\#2})$$

Where:

$T_l(\text{ant}\#1)$—is the Transfer parameters of Probe antenna #1. The underscore 'l' denotes that physical port of the antenna is at the left side of the equation (the '$S_{11}$' term is at the physical port).

$T(\text{Cpl})$—is the Transfer parameters representing the coupling between the antennas. This represents the region between the 'spatial' ports of the antennas.

$T_r(\text{ant}\#2)$—is the Transfer parameters of Probe antenna #2. The underscore 'r' denotes that physical port of the antenna is at the right side of the equation (the '$S_{22}$' term is at the physical port of the antenna).

Similarly to the measurement between probe antennas #1 and #2, measurements are performed between the pairs #2 and #3, and #1 and #3 (steps 320 and 330). Assuming that the attachment is the same between all measurements, the following equations are provided:

$$T(\text{ant1, ant2}) = T_l(\text{ant}\#1) \cdot T(\text{Cpl}) \cdot T_r(\text{ant}\#2)$$

$$T(\text{ant2, ant3}) = T_l(\text{ant}\#2) \cdot T(\text{Cpl}) \cdot T_r(\text{ant}\#3)$$

$$T(\text{ant1, ant3}) = T_l(\text{ant}\#1) \cdot T(\text{Cpl}) \cdot T_r(\text{ant}\#3)$$

The three sets of measurements are now used to estimate the parameters of the three probe antennas. Assuming that the coupling between antennas is of a reflection free medium, the matrix $T(\text{Cpl})$ is with zero diagonal terms and equal off-diagonal terms, and we can decompose it into a product of two equal matrices $T'_l(\text{Cpl}) \cdot T'_r(\text{Cpl}) = T(\text{Cpl})$. Then we can convert the antenna transfer parameters into equivalent parameters "half-way through the medium" for example the equivalent $T_l(\text{ant}\#1)$ is $T_l(\text{ant}\#1) \cdot T'_l(\text{Cpl})$ where $T'_l(\text{Cpl}) \cdot T'_r(\text{Cpl}) = T(\text{Cpl})$."

The three spatially-adjusted T-matrices of the probe antennas may now be extracted from the measurements $T(\text{ant1,ant2})$, $T(\text{ant2,ant3})$ and $T(\text{ant1,ant3})$ in step 340.

Figure 6:
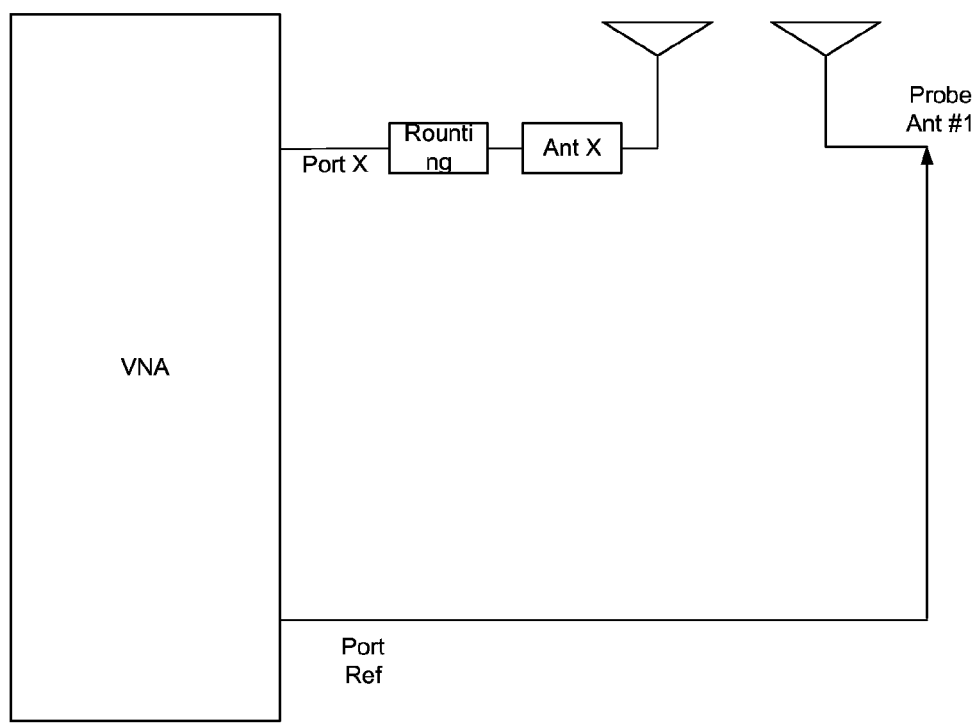
FIG. 6—shows a simplified block diagram of the second phase of the antenna array calibration process according to embodiments of the present invention.

In the second phase (380) the external antenna unit 260 is connected to the antenna array unit 220 to measure the S-parameters of each antenna in the antenna array unit. For example as shown in FIG. 6, antenna probe #1 of the external antenna unit 260 is connected to Antenna X of the antenna array unit 220 and the measured signal is represented as follows:

$$T(\text{ant } x, \text{ pr ant1}) = T_l(\text{ant } x) \cdot T(\text{Cpl}) \cdot T_r(\text{pr ant1})$$
$$= T_l(\text{ant } x) \cdot T'_l(\text{Cpl}) \cdot T'_r(\text{Cpl}) \cdot T_r(\text{pr ant1})$$

Based on the measurements of phase 1, the Transfer parameters for each of the antenna's under test in antenna array is calculated:

$$T_{calculated}(\text{ant } x) = T_l(\text{ant } x) \cdot T'_l(\text{Cpl})$$

The calculated parameters of the antenna under test (antenna 225) include the term $T'(\text{cpl})$, meaning that the parameters include a component related to the propagation through the coupling medium, in the same way as we had with the probe antennas. This component is taken into account in the sequel when the properties of DUT are extracted from reflection measurements.

According to some embodiments of the invention the following method may be used for finding S-parameters of a single antenna from antennas pair measurement:

Problem definition:

Assuming we have the following matrix equations:

$$X = T_l(A) \cdot T_r(B)$$

$$Y = T_l(A) \cdot T_r(C)$$

$$Z = T_l(B) \cdot T_r(C)$$

Where X,Y,Z are all known 2×2 matrix, and $T_l(A)$, $T_l(B)$, $T_r(C)$, $T_r(B)$ are 2×2 unknown matrix represent the Transfer parameters to be found.

Solution:

Using a matrix manipulation process we have:

$$Y^{-1} \cdot X = (T_l(A) \cdot T_r(C))^{-1} \cdot (T_l(A) \cdot T_r(B)) = T_r^{-1}(C) \cdot T_r(B)$$

$$Z^{-1} \cdot Y^{-1} \cdot X = (T_l(B) \cdot T_r(C) \cdot T_r^{-1}(C) \cdot T_r(B) = T_l(B) \cdot T_r(B))$$

Now we need to solve the equation: $T_l(B) \cdot T_r(B) = T(R)$ where $T(R)$ is known.

For that we need to obtain the relation between $T_l(B)$ and $T_r(B)$.

First, we develop it for S-parameters representation.

We define $S(R) = S_l(B) \& S_r(B)$. Where $S(R)$ is concatenation of two S parameters of B antenna.

For S-parameters, the $S_l$ and $S_r$ 2×2 matrix elements meet the following equations:

$$S_{r(1,1)}(B) = S_{l(2,2)}(B) \overset{def}{=} a$$

$$S_{r(1,2)}(B) = S_{l(2,1)}(B) \overset{def}{=} b$$

$$S_{r(2,1)}(B) = S_{l(1,2)}(B) \overset{def}{=} c$$

$$S_{r(2,2)}(B) = S_{l(1,1)}(B) \overset{def}{=} d$$

Since the antenna to antenna is reciprocal, S matrix is symmetric and we have:

$$c \overset{def}{=} S_{l(1,2)}(B) = S_{l(2,1)}(B) \overset{def}{=} b$$

Using these definitions, we have:

$$S_r(B) = \begin{bmatrix} a & b \\ b & d \end{bmatrix}$$

$$S_l(B) = \begin{bmatrix} d & b \\ b & a \end{bmatrix}$$

Converting to T representation we have:

$$T_r(B) = \frac{1}{b} \cdot \begin{bmatrix} b^2 - a \cdot d & a \\ -d & 1 \end{bmatrix}$$

$$T_l(B) = \frac{1}{b} \cdot \begin{bmatrix} b^2 - a \cdot d & d \\ -a & 1 \end{bmatrix}$$

So $T(R) = T_l(B) \cdot T_r(B)$. Multiplying, moving back to S parameters and simplifying we get:

$$S(R) = \frac{1}{d^2 - 1} \cdot \begin{bmatrix} a - b^2 \cdot d & -b^2 \\ -b^2 & a - b^2 \cdot d \end{bmatrix}$$

Now, we have one free parameter for those equations. Choosing d=0 (no reflection from 'spatial port'), we get:

$$S(R) = \begin{bmatrix} -a & b^2 \\ b^2 & -a \end{bmatrix}$$

And this could be solved for a and b and hence $S_f(B)$.

Now in order to find $T_f(B)$, all we need to do is convert $S_f(B)$ from S representation to T representation.

The same procedure can be done to find $T_f(A)$ and $T_f(C)$.

Figure 7:
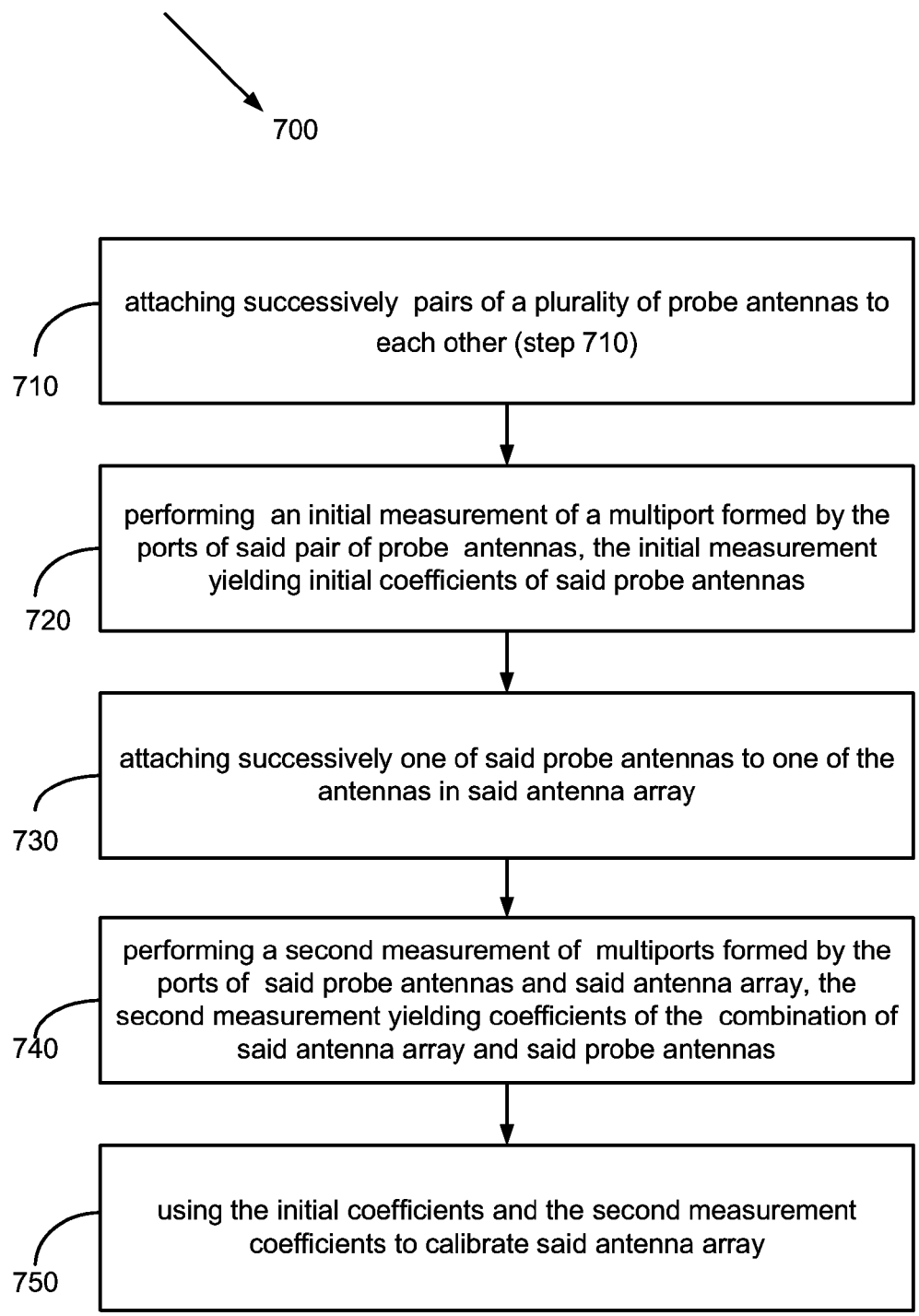
FIG. 7—is a simplified flow chart illustrating a method for calibrating the array system according to embodiments of the present invention.

Reference is now made to FIG. 7, which is a simplified high level flow chart illustrating the steps of an antenna system calibration method 700, according to some embodiments of the invention. It is understood that method 700 may be implemented by an architecture that is different from the aforementioned architecture of system 200. Method 200 may include: attaching successively pairs of a plurality of probe antennas to each other (step 710); performing an initial measurement of a multiport formed by the ports of said pair of probe antennas, the initial measurement yielding initial coefficients of said probe antennas (step 720); attaching successively one of said probe antennas to one of the antennas in said antenna array (step 730); performing a second measurement of multiports formed by the ports of said probe antennas and said antenna array, the second measurement yielding coefficients of the combination of said antenna array and said probe antennas (740); and using the initial coefficients and the second measurement coefficients to calibrate said antenna array (750).

It is expected that during the life of a patent maturing from this application many relevant network analyzers or VNA and antenna technologies will be developed and the scopes of the corresponding terms are intended to include all such new technologies a priori.

The terms "comprises", "comprising", "includes", "including", "having" and their conjugates mean "including but not limited to". The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. A method for calibrating an antenna array using probe antennas, said antenna array comprising a plurality of antennas and said probe antennas comprising a plurality of probe antennas, the method comprising:
    (a) representing the response of an antenna of said antenna array or said probe antennas by network parameters of a 2-port device wherein one port of said 2-port device is a physical antenna port, and the other port is a spatial antenna port;
    (b) representing the response from one antenna attached to another antenna for an antenna pair as a concatenation of the response from the physical port to the spatial port of a first antenna and the response from the spatial port to the physical port of a second antenna;
    (c) attaching successively a first antenna of the plurality of probe antennas to a second antenna of said plurality of probe antennas for a plurality of pairs of said plurality of probe antennas;
    (d) measuring for each probe antenna pair of said plurality of pairs, the S-parameters between the physical ports of said plurality of probe antennas;
    (e) extracting from said measurements the network parameters of the plurality of probe antennas;
    (f) attaching successively the plurality of antennas of the antenna array to at least one antenna of said plurality of probe antennas for a plurality of antenna pairs;
    (g) measuring for each said plurality of antenna pairs the S-parameters between the physical ports of said pairs of antennas; and
    (h) extracting the network parameters of each antenna in the antenna array using said S-parameters measurements and the extracted network parameters of said plurality of probe antennas.

2. A method of claim 1, wherein said network parameters are one of S-parameters, T-parameters, Z-parameters or Y-parameters.

3. The method according to claim 1, wherein said S-parameters measurements are performed by a Radio Frequency Signals Measurement Unit (RFSMU).

4. The method according to claim 3, wherein said RFSMU is a Vector Network Analyzer (VNA).

5. The method according to claim 1 wherein said plurality of probe antennas comprises three antennas.

* * * * *